March 20, 1962 D. PATTERSON, JR 3,025,699
TEAR TEST APPARATUS

Filed Oct. 7, 1960 4 Sheets-Sheet 1

INVENTOR.
DONALD PATTERSON, JR.

BY *Harry J. M<sup>c</sup> Cauley*

ATTORNEY

March 20, 1962     D. PATTERSON, JR     3,025,699
TEAR TEST APPARATUS

Filed Oct. 7, 1960     4 Sheets-Sheet 2

INVENTOR.
DONALD PATTERSON, JR.

BY *Harry J. McCauley*

ATTORNEY

March 20, 1962 D. PATTERSON, JR 3,025,699
TEAR TEST APPARATUS
Filed Oct. 7, 1960 4 Sheets-Sheet 3

INVENTOR.
DONALD PATTERSON, JR.
BY Harry J. McCauley
ATTORNEY

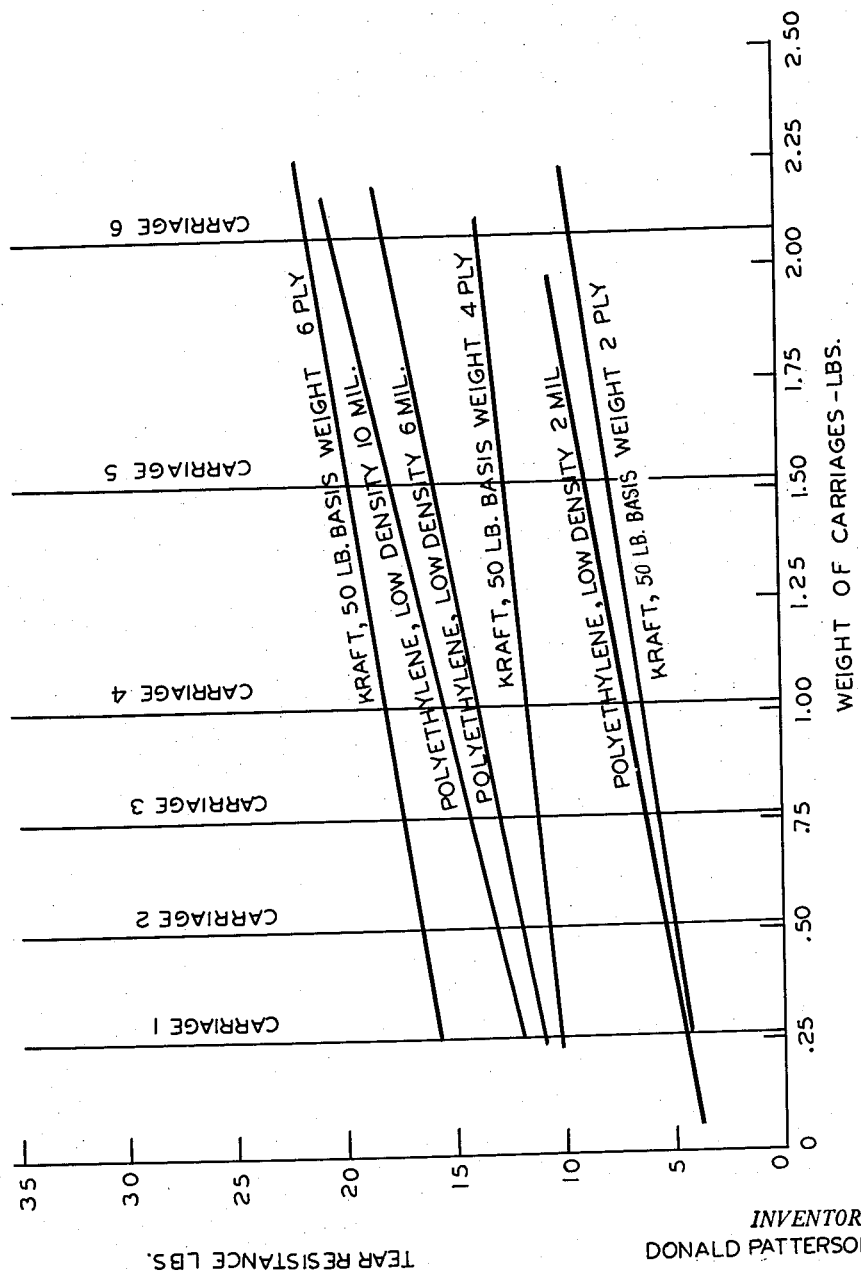

3,025,699
    TEAR TEST APPARATUS
Donald Patterson, Jr., Wilmington, Del., assignor to E. I.
  du Pont de Nemours and Company, Wilmington, Del.,
  a corporation of Delaware
        Filed Oct. 7, 1960, Ser. No. 61,195
              4 Claims. (Cl. 73—88)

This invention relates to a tear test apparatus, and particularly to a puncture-propagation of tear test apparatus intended for use on webs such as textiles, polymeric films, paper and the like.

It has hitherto been the practice to evaluate the strengths of webs by knife shear tests, hydraulic pressure pop tests and variations thereof; however, these tests have not proved valid for polymeric films, which have flow properties not found in the more rigid structures inclusive of paper and textiles, which latter comprehends both woven and non-woven fabrics. In addition, most often the failure of such webs in use is due to puncture by sharp points such as nails, splinters, stones or the like, which, to the extent that they hold back on the web, is followed by propagation of tear occurring during continuation of relative movement of the web with respect to the sharp point, a common example being that of a bag loaded with particulate solid material. This is a condition not simulated by the test apparatus currently used in industry.

U.S.P. 2,706,909 discloses a pendulum type test apparatus wherein penetration resistance exclusive of propagation of tear is evaluated by disposing a sample at progressively greater inclination to the path of a sharp point traveling in an arcuate path tangent to the sample. Penetration itself is, of course, objectionable, but often a material has relatively high penetration resistance and thus will not fail even after being punctured, so that penetration resistance per se is actually of only incidental interest unless the follow-through data relating to tear propagation is also accumulated.

Figure 1:
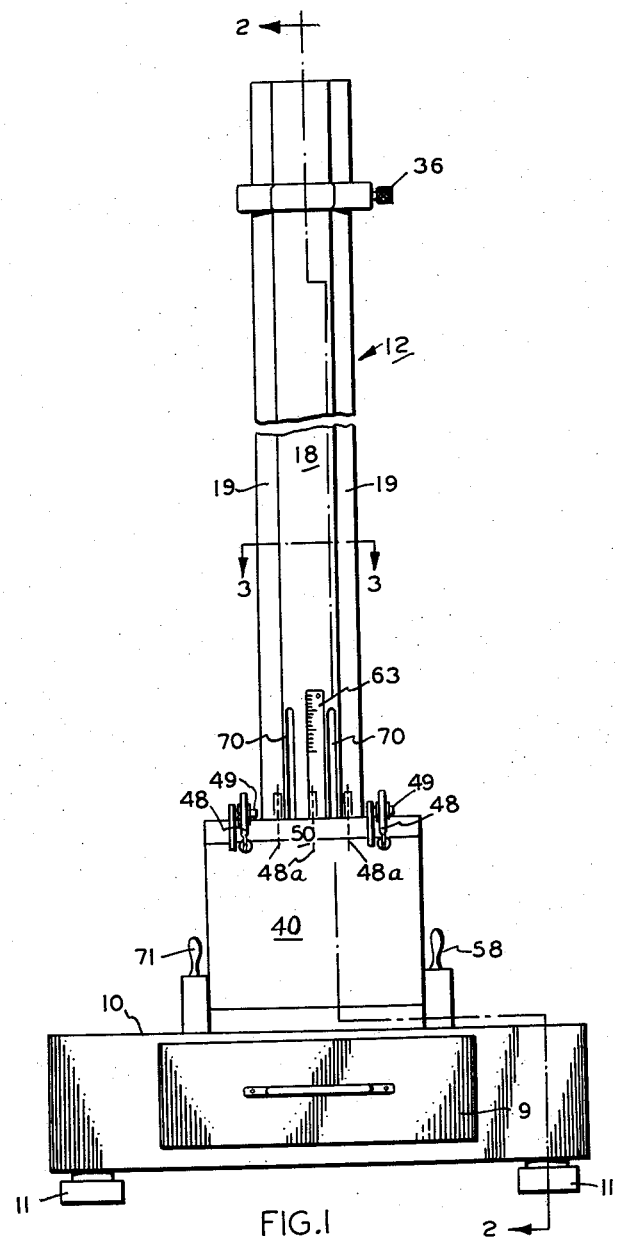
Figure 2:
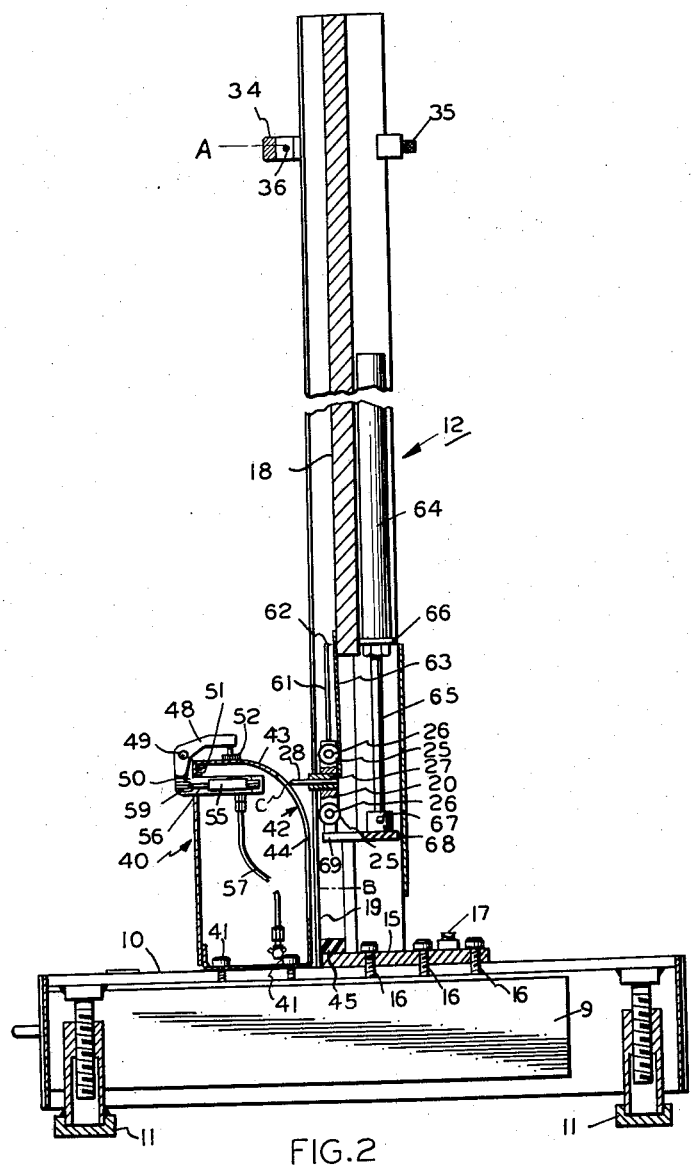
Figure 3:
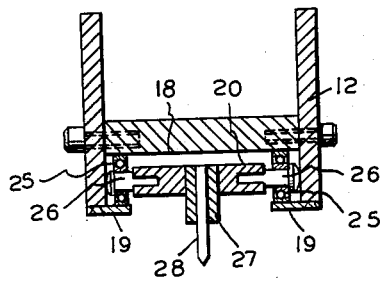
Figure 4:
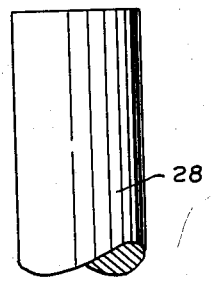
Figure 6:
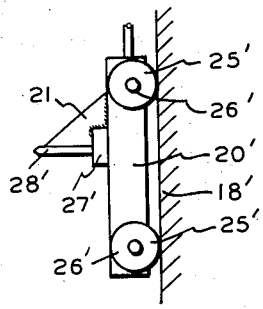

An object of this invention is the provision of a puncture-propagation of tear test apparatus which simulates closely the failure in practice of webs of all kinds, including polymeric webs. Other objects of this invention are to provide a tear test apparatus which is relatively low in cost, rugged in design and adapted to use by untrained personnel. The manner in which these and other objects of this invention are attained will become apparent from the following description and the drawings, in which:

FIG. 1 is a front elevation view to reduced scale of a preferred embodiment of apparatus constructed according to this invention, FIG. 2 is a section taken on line 2—2 of FIG. 1 with the probe carriage shown in the position it assumes at the instant the probe tip makes contact with a web in test, FIG. 3 is a section taken on line 3—3 of FIG. 1 with the probe carriage shown in horizontal center section also, FIG. 4 is a detailed view of the puncture-tearing end of the testing probe of the apparatus of FIG. 1, FIG. 5 is a plot of test results in the machine direction on six different web specimens using different weights of probe-carriage assemblies, and FIG. 6 is a side elevation view of an alternate design of probe-carriage especially adapted to the testing of heavy gage materials.

Generally, the puncture-propagation of tear test apparatus of this invention comprises in combination a substantially vertical guideway, a carriage slidably mounted on the guideway adapted to free fall along the guideway under the influence of gravity, the carriage being provided with a probe oriented substantially horizontally outward from the guideway and formed to a point at the outboard end, sample retention means disposed adjacent to the lower end of the guideway provided with a sample retention face inclined downwardly at the top across the line of vertical travel of the probe on the carriage with the lower continuation of the face substantially vertical and slotted along the line of vertical travel of the probe and carriage to a width receiving the full width of the probe with lateral clearance therewith and to a length affording free vertical travel of the probe over at least the full range of tear tests which the apparatus is adapted to perform.

Referring to FIGS. 1, 2 and 3 particularly, the apparatus is provided with a rectangular base plate 10 supported at the four corners by vertically adjustable feet 11 of conventional design. If desired, this base can be provided with drawer hanger strips, not detailed, supporting a sliding drawer 9 as a convenient storage facility for the several masses of carriage hereinafter described. The vertical guideway, indicated generally at 12, is provided with an integral flanged base 15, fixedly attached to the top of base plate 10 by machine screws 16, and a circular spirit level 17 mounted on base 15 gives indication aiding adjustment of the level to a horizontal plane. The front face of guideway 12 is machined to provide a smooth way 18 (FIG. 3) which is overlaid along the edges with flange plates 19 providing, in the clearance therebetween, a close clearance track for free gravity fall of the carriage 20 along the length of guideway 12.

Carriage 20 is a flat metal plate provided at all four corners with free-turning wheels 25, which conveniently consist of individual ball bearing assemblies mounted on machine screws 26 as axles. Carriage 20 is drilled centrally to receive bushing 27 within which horizontally disposed probe 28 is seated, the whole assembly being made rigid against relative movement of the probe with respect to the carriage. Typically, probe 28 (FIG. 4) consists of a ⅛″ diameter circular cross section steel pin tapered to a 30° point 29 at the outboard end, the sharp end of which is thereafter blunted to a round profile formed on a 0.005″ radius as denoted at 30. This design of probe point has proved especially desirable in service, because it is not dulled nearly so quickly as is the case with a pin brought to a sharp tapered point over the complete end portion. The length of probe 28 is typically 1%₆″ located flush with the bottom surface of carriage 20, which typically is 0.40″ thick, providing a very rigid probe construction.

Carriage 20 is adapted to fall from the upper extremity A of its course, referred to the positions of probe 28 in all instances, along guideway 12 to an extreme low point B during each individual test and is retained in its poised top position by collar 34 attached to the rear side of guideway 12 by one or more thumbscrews 35. Collar 34 is provided with a horizontally disposed manually removable locking pin 36 adapted to lie across the underside of probe 28, thereby retaining carriage 20 against travel down guideway 12 until the operator is ready to conduct a test.

It is desirable to provide the apparatus with a shock-absorbing bumper 45 at the foot of guideway 12, and this can consist of a thick pad of resilient material, such as soft rubber or the like, cemented or otherwise attached to the top of base 15 in line with the drop course of carriage 20, thereby protecting the carriage from damage through impact should probe 28 tear through the full length of sample opposed to it.

The sample retention means, indicated generally at 40, consists of a box-like enclosure attached to base 10 by machine screws 41 with the sample retention face 42 directed towards guideway 12 and closely adjacent thereto.

Preferably, the sample retention face is formed to an arcuate profile 43 (typically 4⅜" radius) in the upper region, continued along the vertical to the base at a clearance of about ¼" from the outside surfaces of flange plates 19. The sample retention face obtrudes across the path of vertical travel of probe 28 at point C near the top of the retention face and the face is cut away with a continuous slot 44 (typically 3/16" wide) in alignment with the path of travel of probe 28 providing sufficient clearance for free passage of the probe along the slot. The vertical projected length of a typical slot 44 is 5.4", with a vertical section thereof measuring 3.0".

The sample retention means is provided at the upper corner remote from guideway 12 with a set of five bell cranks 48, only the two outermost of which are shown in full in FIG. 1, although the vertical center lines of the inside ones are represented by broken lines 48a. Bell cranks 48 are fixedly attached to stub shafts 49 journaled in pillow block 50 securely attached to sample retention means 40 by machine screws 51. The top arms of the bell cranks are provided with rubber-sheathed presser feet 52 adapted to simultaneously abut the top surface of sample retention face 42 when disposed in locking position as shown in FIG. 2 and to clear face 42 in the opposite extreme position, thereby opening up space for the insertion of the upper edge of a test sample thereunder, which sample is allowed to drape freely downwardly over the entire expanse of slot 44. Conveniently, bell cranks 48 are operated in unison by air pressure and a conventional pneumatic power cylinder (not described in detail) is indicated at 55 with piston rod 56 pinned to the lower arms of all five of the bell cranks by a common clevis connection 59. The air supply line 57 for power cylinder 55 is provided with an air supply control valve 58 convenient to the hand of the operator, who normally stands back of sample retention means 40 facing guideway 12.

As a safety feature, it is preferred to provide the apparatus with pneumatic means adapted to lift carriage 20 to well above the upper level of sample retention means 40, so that the operator can grasp it with his fingers and more readily restore it to position A preparatory to a new test. This auxiliary comprises a conventional double-acting pneumatic power cylinder 64 provided with a downwardly disposed piston rod 65, which is supported by a shelf 66 integral with the rear side of guideway 12. The outside end of piston rod 65 is provided with a fork 68 pinned thereto at 67, one prong of which is shown at 69 in FIG. 2, which prongs extend through slots 70 in the front of guideway 12 and underlie carriage 20. At the extreme downward extended position of piston rod 65, it will be understood that lateral clearance is provided in the construction, so that the fork prongs lie well below the level of bumper 45. The operative air supply facilities and tubing for power cylinder 64 are not further detailed herein, because they are entirely conventional; however, the operating air control valve for the carriage lift auxiliary is represented at 71, FIG. 1.

The trailing end of carriage 20 is provided with a pointer 61, the upper end 62 of which lies adjacent a vertical steel gage 63 attached to the center expanse of way 18. Gage 63 is ruled in both metric and English units of ½ mm. and 1 mm. and 32nds and 64ths inches, respectively, to permit precise measurement of propagation of tear as hereinafter described. The zero point of gage 63 is disposed at a vertical level corresponding to a probe location at point C, whereupon the gage reading is the projected tear length directly which, tests have confirmed, can be considered to be the actual tear length without introduction of error in the test results.

The operation of the apparatus merely involves placing the upper edge of a sample, typically measuring 8" x 8" in size, under presser feet 52 and draped freely downwardly over slot 44. At this time air valve 71 has been operated to position piston rod 65 in its extreme downward extended position, so that the fork prongs lie below the top surface of bumper 45 and the full length of guideway 12 is thus unobstructed and available to free fall of carriage 20-probe 28. Thereafter, carriage 20 is released from its position A of predetermined height, typically 20" above the point of puncture C, by withdrawal of locking pin 36 and allowed to fall until brought to rest by the resistance to tear of the sample, or until the carriage strikes bumper 45 at the bottom of guideway 12, whichever first occurs. The length of tear, as measured by the position of pointer end 62 with reference to gage 63, is then read and, by reference of this reading to a previous calibration plot, the relative strength of the sample is immediately ascertainable. Then air valve 71 is operated to raise carriage 20-probe 28 to a convenient height where the operator is enabled to reposition it to level A for a new test. Once the carriage is restored to its position at the top of guideway 12, air valve 71 is again operated to move piston rod 65 to its bottom position below bumper 45, and all is then in readiness for conducting the next tear test.

It will be understood that the tear length is a measure of the energy absorbed by the sample in terminating the travel of carriage 20-probe 28, i.e., the work done by the tear propagating probe on the sample. The principle is clear from an approximation formula relating the various factors involved. Thus, if $w$=the weight of carriage 20 complete with probe 28 and bushing 27, $h$=the height of the carriage, above the sample, equal to the vertical distance between points A and C, and $L$=the length of the tear, which can be taken as the reading of pointer 62 with respect to gage 63 for all practical purposes, as hereinbefore described, the work done on the sample equals the force, $f$ exerted by probe 28 in propagating the tear times L. But $w(h+L)=f \times L$ whereupon $f$, the tear resistance, is computed as:

$$f = \frac{w \times h}{L} + w$$

in any consistent units of length and mass. The foregoing approximation assumes that tear resistance is constant with velocity and, moreover, that no compensation is necessary ascribable to the angle at which probe 28 punctures the sample. Extensive testing investigation with numerous materials has confirmed the fact that both of these assumptions are completely warranted and that, within the limits of normal experimental error, operation of the test apparatus is accurate and consistent as well as independent of the nature of the material in test.

Test investigation has revealed that variation of the combined weight of carriage and probe caused the most significant variation in results, due to the fact that, generally, samples are able to absorb proportionately more energy over a longer tear length. However, if test results are normalized in terms of one carriage weight the percentage difference in test results amounts to less than 10% for most individual tests, which constitutes quite good agreement in empirical testing of the nature involved. This variation for three different gages of polyethylene films and three different weights of kraft papers, all tested in the machine direction, is plotted in FIG. 5 for all six specific carriage weights ranging from 0.26 lb. to 2.08 lbs., respectively. Confirmatory tests made in the cross section direction of the samples yielded similar results. It will be seen that a wide range of carriage masses can be employed to extend the test range at will to accommodate stronger or weaker materials while still obtaining comparable test results. A series of six probe-carriage assemblies weighing, respectively, 0.26, 0.51, 0.76, 1.01, 1.51, and 2.08 lbs. proved adequate over the range of most web materials, and drawer 9 in the base structure is a convenient place for the storage of reserve carriages. In practice, carriage No. 3 of FIG. 5 weighing 0.76 lb. was the most versatile of the group and thus was the standard to which most readings were normalized. Because the dimensional factor cancels in both numerator and denominator of the force equation, it is practicable to measure tear lengths in the more accurately readable metric units. Using this procedure, I have found it advisable to resort to the next higher weight probe-carriage assembly of the series described whenever the tear length measures less than about 4 cm. Also, it is desirable to average the results of about ten individual tests of a given sample for best accuracy. It has proved unnecessary to reserve a separate sample for each of these tests, however, because it is possible to subject the same sample to a succession of tests, so long as a minimum separation of about 1" is preserved between adjacent tears.

It is practicable to construct the carriage 20-probe 28 in a wide variety of weights. Thus, I have found it desirable to utilize a light polymeric block carriage devoid of wheels but raised from way 18 on slight protuberances so as to reduce friction during free fall along guideway 12. The total weight of this carriage-probe was only 44.2 gms. (0.097 lb.), which was useful in the measurement of tear strength of very thin polymeric films of 1 mil gage or less. At the other extreme, where the tear strength of very strong materials, including even wire mesh screen, was desired, a heavy carriage of 2.08 lbs. was essential. In the latter case, it proved desirable to buttress probe 28, as shown in FIG. 6, by backing it up with a triangular metal brace 21 in abutment with the trailing edge thereof, i.e., welded solely to bushing 27' and carriage 20'. The thickness of brace 21 was chosen to be less than the diameter of the probe per se and the brace was disposed entirely back of the probe itself, and also considerably below the probe point, so as not to interfere in any way with the conduct of testing.

The apparatus of this invention is apparently practically independent in its operation of the effects of the web puncture per se. Thus, a series of prepunctured samples subjected to tests yielded strength results indistinguishable from samples initially free of punctures, within at least the limits of experimental error. Also, sample retention means of widely different curvatures of retention face 43 were subjected to comparative tests using the same web materials, and it was found that this factor had practically no effect at all on the results obtained, so that it is possible to vary the construction widely in this respect without variance in the operation obtained. As an example, at one extreme of design the upper part of retention face 43 was formed as a straight plane inclined at an angle of about 45° from the horizontal in the direction of guideway 12, and thereafter continuing in a vertical plane downward with only a slight radius provided at the connecting corner to avoid the possibility of any cutting or breaking of the sample by whipping against a sharp edge under the descent of the carriage from above. This design was entirely satisfactory in use, although somewhat less preferred from an arcuately formed retention face, because the sample does not drape as nicely with respect thereto. On the other hand, varying the drop height of the probe-carriage assembly revealed a significant increase in test strength with increase in drop height. Accordingly, it is desirable to perform mutually comparable testing from a constant drop height, it being understood, however, that different drop heights can be settled on to suit the particular strength or intended end uses of given classes of materials wherever this becomes necessary. Another factor which it was thought might have a bearing on test results was the lateral restraint imposed on the sample. Thus, weighted flexible bands were placed along both lengthwise edges of the downwardly draped sample without, however, effecting the results of test which were, again, indistinguishable from unweighted control tests. On the basis of these latter tests it was concluded that side anchoring of the sample was generally a superfluous refinement, except in the case of extremely thin gage, pliable films where the sample sometimes displayed a tendency to evade the probe by deflection into slot 44 under the impress of the probe.

From the foregoing it will be understood that this invention can be modified extensively without departure from its essential spirit and it is intended to be limited only by the scope of the following claims.

What is claimed is:

1. A puncture-propagation of tear test apparatus comprising in combination a substantially vertical guideway, a carriage slidably mounted on said guideway adapted to free fall along said guideway under the influence of gravity, said carriage being provided with a probe oriented substantially horizontally outward from said guideway and formed to a point at the outboard end, sample retention means disposed adjacent the lower end of said guideway provided with a sample retention face inclined downwardly at the top across the line of vertical travel of said probe on said carriage with the lower continuation of said face substantially vertical, said sample retention face being slotted along said line of vertical travel to a width receiving the full width of said probe with lateral clearance therebetween and to a length affording free vertical travel of said probe over at least the full range of tear tests which the apparatus is adapted to perform.

2. A puncture-propagation of tear test apparatus according to claim 1 wherein said probe is circular in cross section.

3. A puncture-propagation of tear test apparatus comprising in combination a substantially vertical guideway, a wheeled carriage slidably mounted on said guideway adapted to free fall along said guideway under the influence of gravity, said carriage being provided with a probe oriented substantially horizontally outward from said guideway and formed to a point at the outboard end, and said guideway being provided at the lower end with a shock-absorbing bumper disposed in the line of vertical travel of said wheeled carriage, sample retention means disposed adjacent the lower end of said guideway provided with a sample retention face inclined downwardly at the top across said line of vertical travel of said probe on said carriage with the lower continuation of said face substantially vertical, said sample retention face being slotted along said line of vertical travel to a width receiving the full width of said probe with lateral clearance therebetween and to a length affording free vertical travel of said probe over at least the full range of tear tests which the apparatus is adapted to perform.

4. A puncture-propagation of tear test apparatus according to claim 3 including powered means for elevating said wheeled carriage from the extreme lowermost point of said free vertical travel at least part of the way up said guideway preparatory to the performance of a tear test, said powered means being provided with control means disposed in a position available for operator manipulation.

References Cited in the file of this patent

UNITED STATES PATENTS 161,737     Beardslee     Apr. 6, 1875